US008837809B2

(12) United States Patent
Jeong

(10) Patent No.: US 8,837,809 B2
(45) Date of Patent: Sep. 16, 2014

(54) METHOD FOR DETECTING A BRIDGE CONNECTING FAILURE

(75) Inventor: Joong-Ki Jeong, Seoul (KR)

(73) Assignee: Koh Young Technology Inc., Seoul (KR)

( * ) Notice: Subject to any disclaimer, the term of this patent is extended or adjusted under 35 U.S.C. 154(b) by 24 days.

(21) Appl. No.: 13/298,684

(22) Filed: Nov. 17, 2011

(65) Prior Publication Data

US 2012/0128232 A1    May 24, 2012

(30) Foreign Application Priority Data

Nov. 18, 2010   (KR) .................. 10-2010-0114997

(51) Int. Cl.
*G06T 7/00* (2006.01)
*G01B 11/25* (2006.01)
*G01B 11/27* (2006.01)

(52) U.S. Cl.
CPC .............. *G01B 11/25* (2013.01); *G06T 7/004* (2013.01); *G06T 7/001* (2013.01); *G06T 7/0008* (2013.01); *G06T 2207/10152* (2013.01); *G06T 2207/30152* (2013.01); *G01B 11/272* (2013.01); *G06T 7/0073* (2013.01)
USPC ....................................................... 382/149

(58) Field of Classification Search
CPC ..................................................... G06T 7/001
USPC ....................................................... 382/149
See application file for complete search history.

(56) References Cited

U.S. PATENT DOCUMENTS

| 2004/0096121 | A1* | 5/2004 | Kanatsu et al. .............. 382/290 |
| 2004/0100586 | A1* | 5/2004 | Li et al. ....................... 348/584 |
| 2005/0258381 | A1* | 11/2005 | Kawase et al. ........... 250/559.45 |
| 2006/0055904 | A1* | 3/2006 | Baselmans ..................... 355/55 |
| 2006/0153439 | A1* | 7/2006 | Moriya et al. ................ 382/147 |
| 2006/0257015 | A1* | 11/2006 | Katahata et al. ............. 382/145 |
| 2006/0291719 | A1 | 12/2006 | Ikeda et al. |
| 2007/0124085 | A1* | 5/2007 | Kalusche et al. ............... 702/20 |
| 2007/0247821 | A1* | 10/2007 | Kobayakawa et al. ........ 361/743 |

(Continued)

FOREIGN PATENT DOCUMENTS

| CN | 1865950 | 11/2006 |
| CN | 101887033 | 11/2010 |

(Continued)

*Primary Examiner* — Stephen R Koziol
*Assistant Examiner* — Delomia Gilliard
(74) *Attorney, Agent, or Firm* — Kile Park Reed & Houtteman PLLC

(57) ABSTRACT

A method for detecting a bridge connecting failure to detect a bridge shorting terminals of a component includes acquiring a 2D image and height-based information through lights irradiated on a board, acquiring rotation information of the component using at least one of the 2D image and the height-based information, establishing an inspection region for detection of the bridge connecting failure using the rotation information, extracting a first bridge region within the inspection region using the 2D image, extracting a second bridge region within the inspection region using the height-based information, and judging whether the bridge connecting failure of the component occurs by using at least one of the first and second bridge regions. Thus, the method may inspect more precisely the bridge connecting failure through the first bridge region extracted from the 2D image and the second bridge region extracted from the height-based information.

11 Claims, 9 Drawing Sheets

(56) References Cited

U.S. PATENT DOCUMENTS

| | | | |
|---|---|---|---|
| 2009/0015818 A1* | 1/2009 | Ikeda et al. | 356/33 |
| 2010/0052697 A1* | 3/2010 | Knippelmeyer et al. | 324/537 |
| 2010/0123854 A1* | 5/2010 | Adachi et al. | 349/61 |
| 2010/0165094 A1* | 7/2010 | Kakuda et al. | 348/92 |
| 2011/0002529 A1* | 1/2011 | Jeong et al. | 382/147 |
| 2011/0249096 A1* | 10/2011 | Umemura | 348/46 |
| 2011/0280470 A1* | 11/2011 | Hayashi | 382/149 |
| 2012/0131529 A1* | 5/2012 | Hayakawa et al. | 716/112 |

FOREIGN PATENT DOCUMENTS

| | | |
|---|---|---|
| EP | 0 871 027 | 10/1998 |
| JP | 01-155248 | 6/1989 |
| JP | 05-135157 | 6/1993 |
| JP | 06-042937 | 2/1994 |
| JP | 2004-317291 | 11/2004 |
| JP | 2006-005238 | 1/2006 |
| JP | 2009-198494 | 9/2009 |
| TW | I299890 | 1/2008 |

* cited by examiner

METHOD FOR DETECTING A BRIDGE CONNECTING FAILURE

CROSS REFERENCE TO RELATED APPLICATION

This application claims priority from and the benefit of Korean Patent Applications No. 2010-114997 filed on Nov. 18, 2010, which is hereby incorporated by reference for all purposes as if fully set forth herein.

BACKGROUND OF THE INVENTION

1. Field of the Invention

Exemplary embodiments of the present invention relate to a method for detecting a bridge connecting failure. More particularly, exemplary embodiments of the present invention relate to a method for detecting a bridge connecting failure to detect a bridge which shorts terminals of components.

2. Discussion of the Background

Generally, components mounted on a board are composed of a body equipped with a driving circuit and a plurality of terminals protruded from a side of body. Each of terminals of the components is electrically connected to pads on the board by a solder.

When each of the terminals is electrically connected to the pads by the solder, the solder substance can be formed between the pads and the terminals. The solder substance formed between the pads electrically connects the terminals, which should be separated from each other, to prevent creating a shorting failure between the terminals. Hereinafter, the solder substance formed between the terminals is referred to as being a "bridge", and the shorting failure generated between the terminals is referred to as being "bridge connecting failure".

Thus, the components are mounted on the board, and then whether a bridge connecting failure generates or not is inspected. Since a conventional 2D inspection method compares an image photographed through a camera simply, the method is limited to accurately inspecting the bridge connecting failure between terminals.

In addition, in case the board is distorted, the position of inspection object components is unsteadily changed. Thus, it is not easy to accurately inspect the bridge connecting failure between terminals.

SUMMARY OF THE INVENTION

Exemplary embodiments of the present invention provide a method for detecting a bridge connecting failure in order to enhance the detection accuracy of the bridge connecting failure generated between terminals on the basis of a height value.

Exemplary embodiments of the present invention also provide a method for detecting a bridge connecting failure in order to measure the rotation information of components and to accurately inspect the bridge connecting failure on the basis of the measured rotation information even though the position of components is changed due to distortion of the board.

Additional features of the invention will be set forth in the description which follows, and in part will be apparent from the description, or may be learned by practice of the invention.

An exemplary embodiment of the present invention discloses a method for detecting a bridge connecting failure that shorts terminals of a component. The method includes acquiring a 2D image and height-based information through a plurality of lights which are irradiated on a board, on which the component is mounted and are reflected from the board, acquiring rotation information of the component using at least one of the 2D image and the height-based information, establishing an inspection region for detecting the bridge connecting failure of the component on the basis of the rotation information, extracting a first bridge region within the inspection region by using the 2D image, extracting a second bridge region within the inspection region by using the height-based information, and judging whether the bridge connecting failure of the component occurs by using at least one of the first and second bridge regions.

The height-based information may include at least one of a height map, a shadow map, and a visibility map.

An exemplary embodiment of the present invention discloses a method for acquiring the rotation information of the component. The method includes generating a reference template corresponding to the height map of the component from underlying data of the component and acquiring the rotation information of the component with comparison between the height map and the reference template. Another exemplary embodiment of the present invention discloses a method for acquiring the rotation information of the component. The method includes generating a shadow template abstracting the shadow of the component from underlying data of the component and acquiring the rotation information of the component with comparison between the shadow map and the shadow template. Still another exemplary embodiment of the present invention discloses a method for acquiring the rotation information of the component. The method includes generating a form template corresponding to the visibility map of the component from underlying data of the component and acquiring the rotation information of the component with comparison between the visibility map and the form template. Yet still another exemplary embodiment of the present invention discloses a method for acquiring the rotation information of the component. The method includes generating a reference image of the component from the underlying data of the component and acquiring the rotation information of the component with comparison between the 2D image and the reference image.

The first bridge region may be a region having the gray scale of 2 the 2D image more than a threshold or a region having the color of the 2D image within a reference color range of solder. In addition, an exemplary embodiment of the present invention discloses a method for extracting the first bridge region. The method includes extracting two or more 2D bridge regions by respectively using two or more 2D images acquired by two or more lights which are illuminated at different angles to the board and reflected from the board and forming the first bridge region by combining the 2D bridge regions.

The height-based information may include the height map of the component, and the second bridge region may be a region having a height value of the height map more than a reference height value. In an exemplary embodiment of the present invention, the height-based information may include the visibility map of the component, and the second bridge region may be a region having a visibility value of the visibility map more than a reference visibility value within the inspection region.

An exemplary embodiment of the present invention discloses a method for judging whether the bridge connecting failure of the component occurs. The method includes forming a final bridge region corresponding to intersection of the first and second bridge regions and judging whether the bridge connecting failure of the component occurs by using the final bridge region. The inspection region may be established between the terminals of the component or the pads of board by using the rotation information.

According to the present invention, a method for detecting a bridge connecting failure may accurately inspect the bridge connecting failure between terminals by using a 2D image and height-based information.

In addition, the method includes extracting a first bridge region from 2D images photographed by lights which are illuminated at different angles, extracting a second bridge region from the height-based information, extracting a final bridge region corresponding to intersection of the first and second bridge regions, and inspecting whether a bridge connecting failure occurs more accurately.

DETAILED DESCRIPTION OF THE ILLUSTRATED EMBODIMENTS

Figure 1:
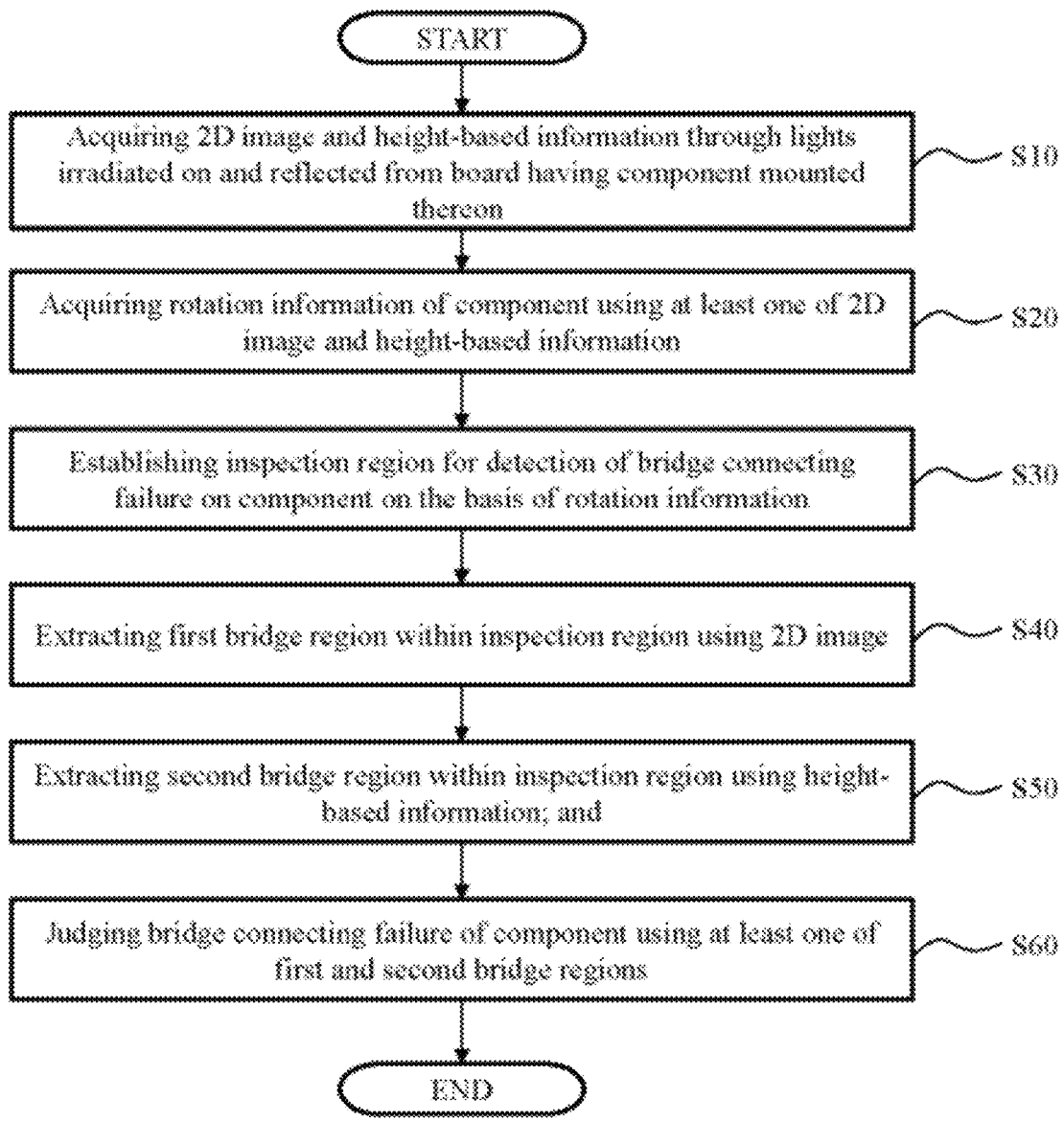
FIG. 1 is a flow chart illustrating a method for detecting a bridge connecting failure according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to the accompanying drawings, preferred embodiments of the present invention will be described in more detail.

Figure 2:
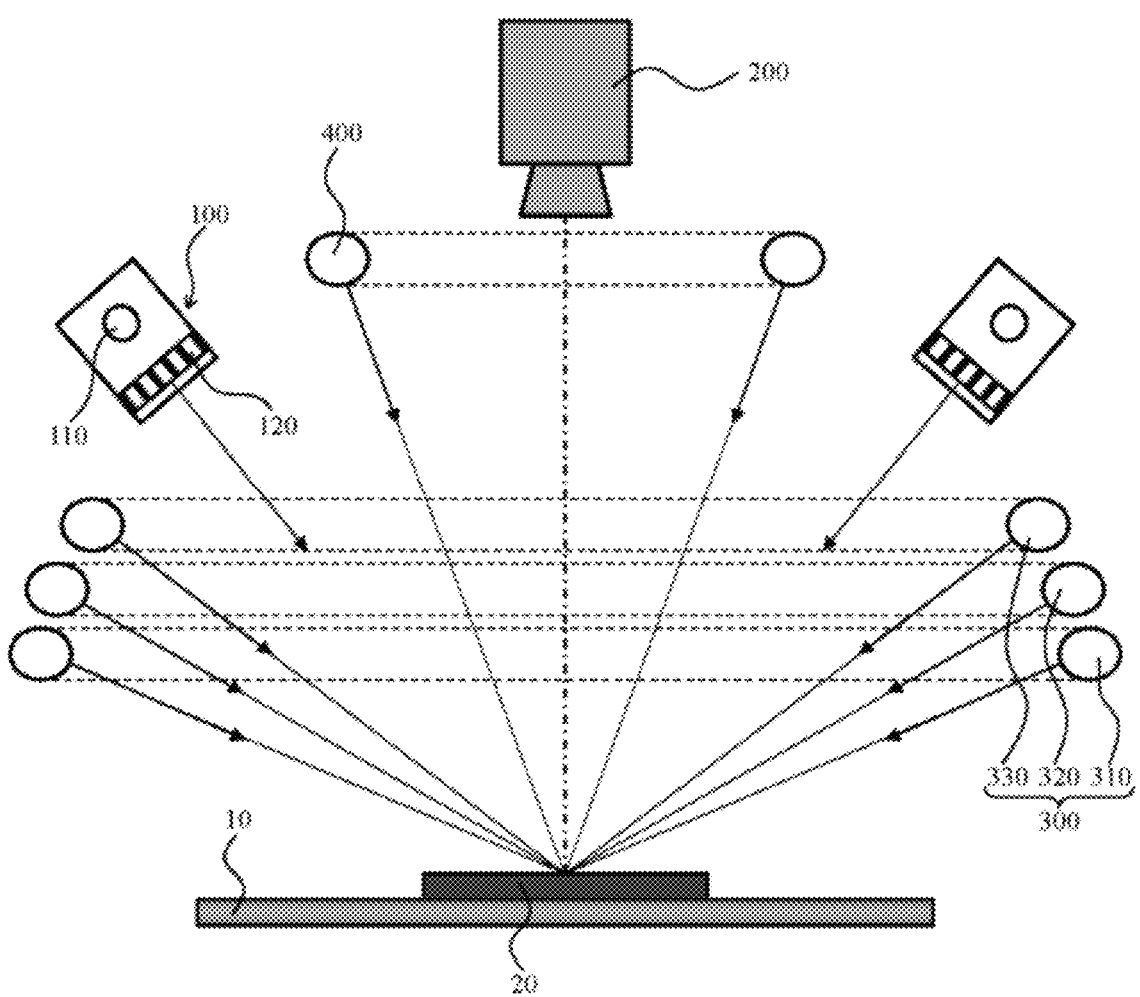
FIG. 2 is a drawing conceptually showing an inspection apparatus used in a method for detecting a bridge connecting failure.
Figure 3:
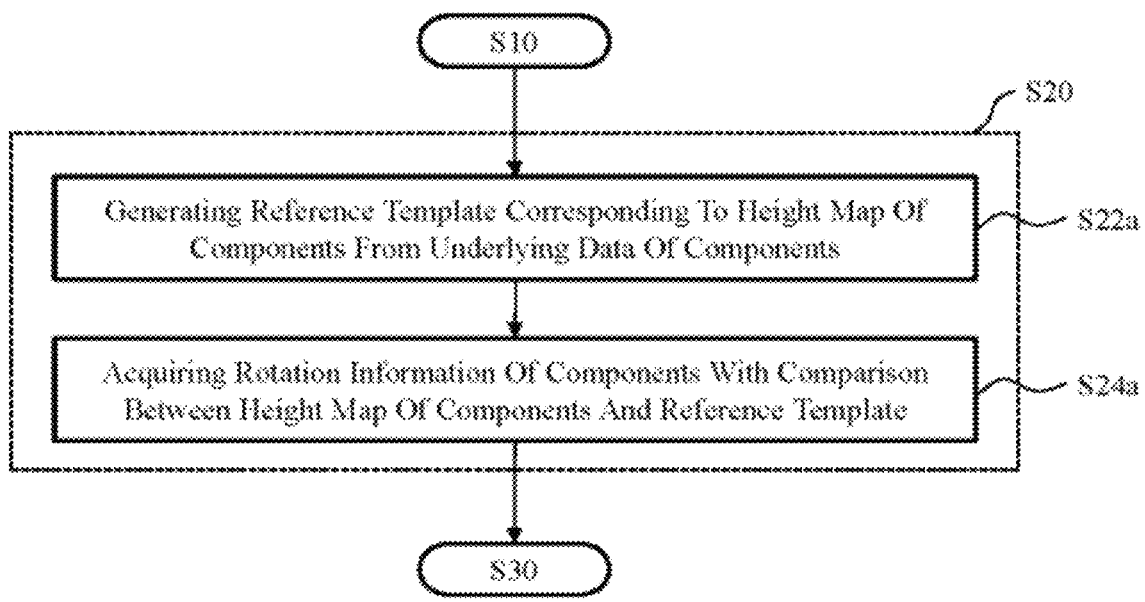
FIGS. 3-5 and 6 are flow charts illustrating a method for acquiring the rotation information of components in a method for detecting a bridge connecting failure.
Figure 4:
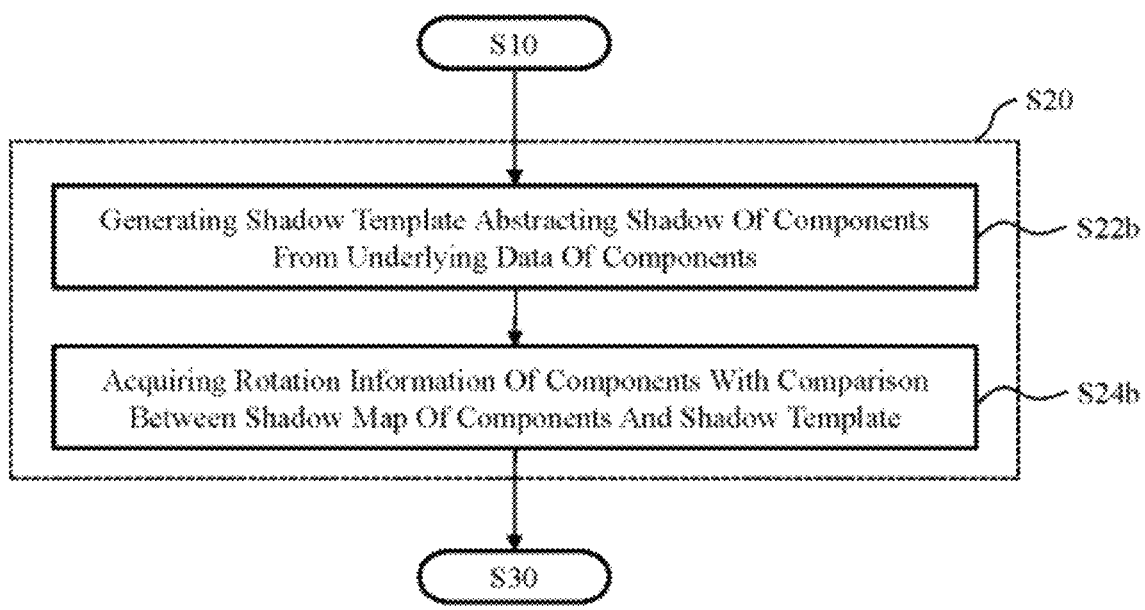
Figure 5:
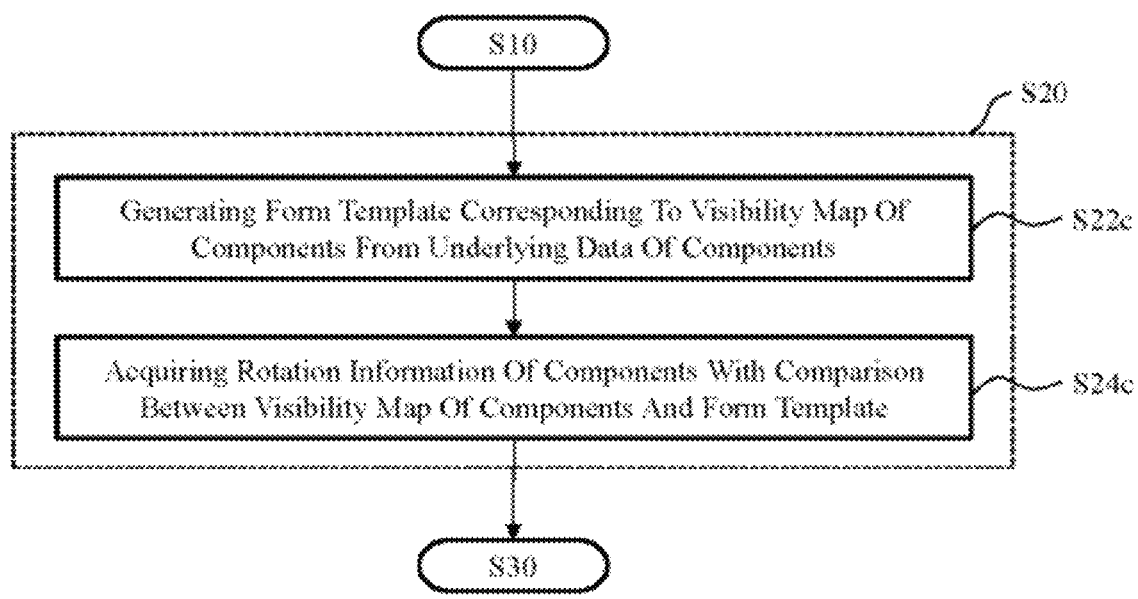

FIG. 1 is a flow chart illustrating a method for detecting a bridge connecting failure according to an exemplary embodiment of the present invention. FIG. 2 is a drawing showing conceptually an inspection apparatus used in a method for detecting a bridge connecting failure.

There will be described the inspection apparatus used in a method for detecting a bridge connecting failure according to the embodiment of the present invention referring to FIG. 2 and a method for detecting a bridge connecting failure referring to FIG. 1.

Referring to FIG. 2, the inspection apparatus photographs an inspected object arranged on the board 10, for example, components 20 and inspects whether the components 20 are properly arranged on the board 10 and are soldered to the board, and comprises a 3D lighting unit 100, a photographing unit 200, and a 2D lighting unit.

The 3D lighting unit 100 is arranged on the stage so that a light is illuminated at a fixed angle to the board 10 arranged on the stage. The 3D lighting unit may be symmetrically arranged on the stage so that a plurality of 3D lighting units, for example, 4 3D lighting units is shaped into a square form.

Each of the 3D lighting units 100 illuminates grating-pattern pattern lights to the board 10. Particularly, each of the 3D lighting units includes a light source 110 generating the light and a grating element 120 changing and emitting the light generated by the light source into the grating-pattern pattern lights. The grating element 120 may move about a predetermined interval in a direction different from the longitudinal direction of a grating pattern, thereby illuminating the grating-pattern pattern lights on the board 10 as the grating pattern is moved by the grating element. In an exemplary embodiment of the present invention, the 3D lighting unit 100 as the unit illuminating the light for extraction of height-based information or the 3D information of components 20 mounted on the board 10 may be a unit providing the grating-pattern pattern lights or a unit providing a laser light as shown in the drawing.

The photographing unit 200 is arranged on the stage to photograph the components 20 through the incident light reflected from the board 10. For example, the photographing unit may be arranged in the center of 4 3D lighting units 100 which are placed in each edge of square.

The photographing unit 200, for example, may include a camera, an imaging lens, and a filter. The camera receives the light reflected from the board 10 to photograph the image of components 20. For example, one of a CCD camera or a CMOS camera may be used as the camera. The imaging lens is arranged in the lower part of the camera to image the light reflected from the components in the camera. The filter is arranged in the lower part of the imaging lens to filter the light reflected from the board 10 and to provide the filtered light to the imaging lens. For example, one of a frequency filter, a color filter, and a light intensity control filter may be used as the filter.

The 2D lighting unit includes two or more 2D lighting units illuminating lights at different angles to the board 10. For example, the 2D lighting unit may include a first 2D lighting unit 300 and a second 2D lighting unit 400.

The first 2D lighting unit 300 illuminates the light at a first angle to the central axis of board 10, and the second 2D lighting unit 400 illuminates the light at a second angle different from the first angle to the central axis of board 10. The central axis of board 10 means a virtual line connecting the board 10 and the photographing unit 200 in the perpendicular direction of board 10. In an exemplary embodiment of the present invention, the 3D lighting units 100 may be arranged to illuminate the light at an angle between the first and second angles to the central axis of board 10.

In an exemplary embodiment of the present invention, the first and second 2D lighting units 300 and 400 are the same type of lighting source and may be different types of lighting sources. The first and second 2D lighting units 300 and 400, as shown in the drawing, may be ring-shaped fluorescent sources formed around the photographing unit 200. The first and second 2D lighting units 300 and 400 may be a single-color light source generating the light of a single wavelength or a complex light source generating a red light, a green light, a blue light, etc. Lights generated in the first and second 2D lighting units 300 and 400 are composed of only a complementary color of the bottom color of board 10, particularly the bottom color of board 10 in inspection regions which will be described later, or may include the complementary color component.

In addition, the first 2D lighting unit 300 is composed of multi-stages to illuminate the light at different angles to the board 10. For example, the first 2D lighting unit 300 includes a first stage lighting unit 310, a second stage lighting unit 320, and a third stage lighting unit 330. Each of the first, second, and third stage lighting units 310, 320, and 330 consists of red, green, and blue light sources to illuminate selectively a desired color, for example, a red, green, blue, or white light to the board 10.

In an exemplary embodiment of the present invention, the inspection apparatus further includes a controller unit (not shown) for controlling respectively the 3D lighting unit 100, the photographing unit 200, the 2D lighting unit, etc.

Referring to FIG. 1, there will be described a method for detecting a bridge connecting failure according to the present embodiment in detail.

In an exemplary embodiment of the present invention, two or more 2D images and height-based information are acquired by photographing a plurality of lights which are illuminated and reflected at different angles to the board 10, on which the components 20 are mounted in step S10.

Particularly, for example, the photographing unit 200 receives the light, which is generated by the first 2D lighting unit 300 and is reflected from the board 10, to photograph a first 2D image, and receives the light, which is generated by the second 2D lighting unit 400 and is reflected from the board 10, to photograph a second 2D image. In an exemplary embodiment of the present invention, the photographing unit 200 receives the light, which is generated by the first stage lighting unit 310 of the first 2D lighting unit 300 and is reflected from the board 10, to photograph a first 2D image, and receives the light, which is generated by the third stage lighting unit 330 of the first 2D lighting unit 300 and is reflected from the board 10, to photograph a second 2D image.

In addition, the photographing unit 200 receives the grating-pattern lights, which are generated by the 3D lighting units 100 and are reflected from the board 10, to photograph height-based information. The height-based information may include at least one of the height map, shadow map, and visibility map of components 20 arranged on the board 10. The height map and the visibility map are formed by extracting N brightness values in each position from N pattern images photographed by the grating-pattern lights which is illuminated from the 3D lighting units 100 and producing a height value and a visibility value in each position using N-bucket algorithm. In addition, the shadow map is formed by composition of shadow images formed as the light of each of the 3D lighting units 100 is illuminated to the components 20.

The rotation information of components 20 is acquired by using at least one of the 2D images and the height-based information in step S20.

Figure 7:
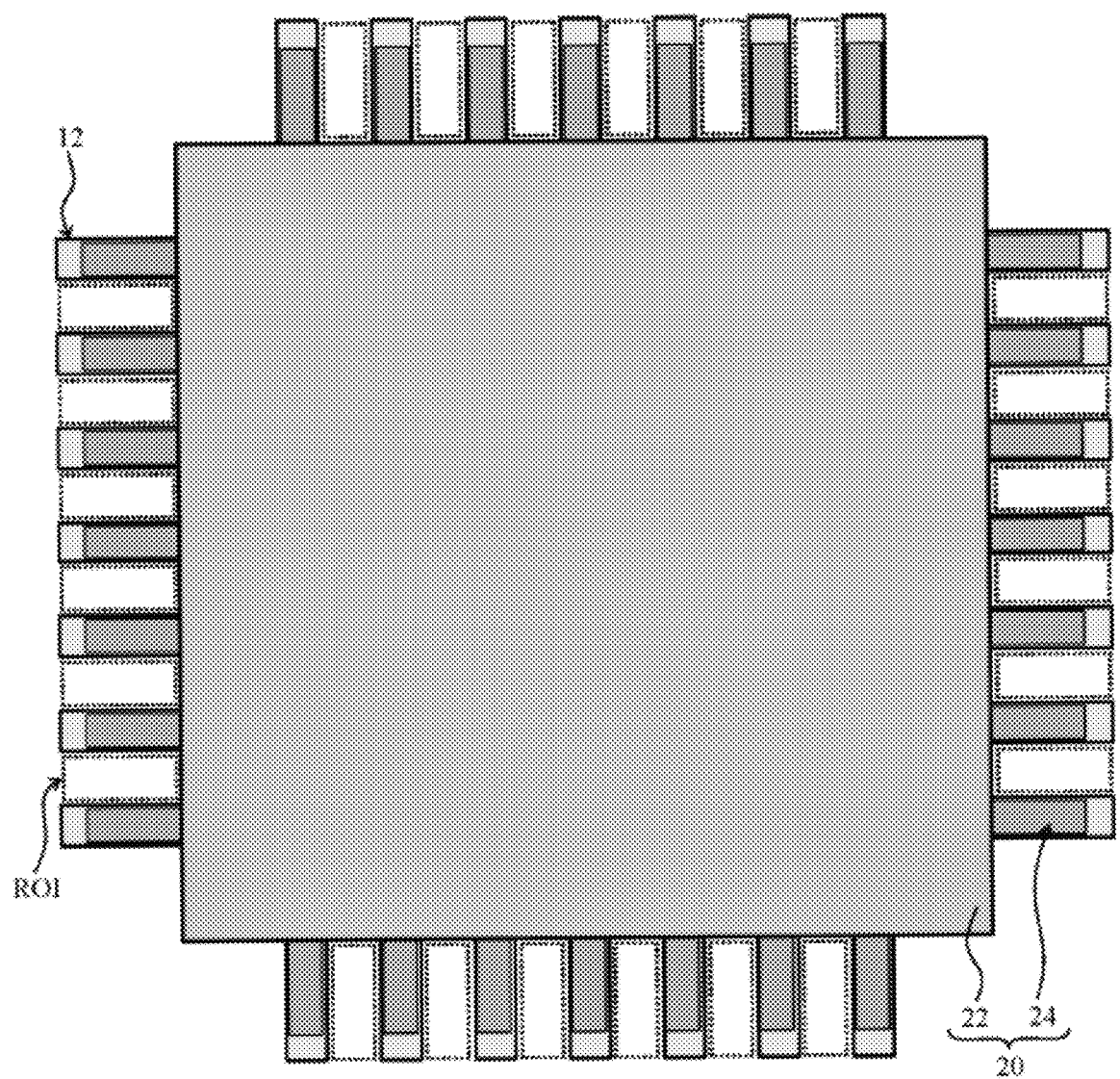
FIG. 7 is a plan view showing a state that components are arranged on the right position on a board.
Figure 8:
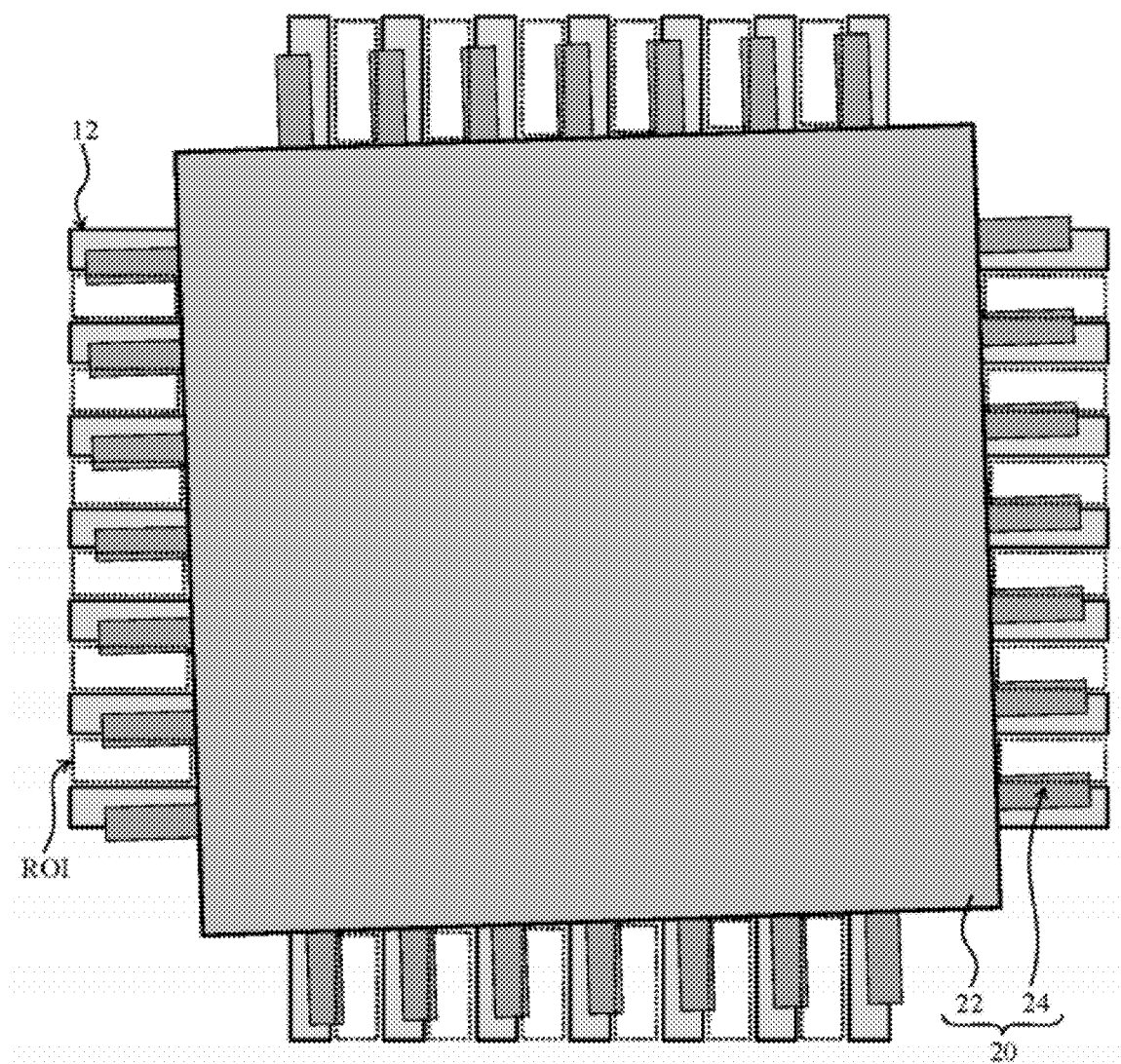
FIG. 8 is a plan view showing a state that components are rotated at a predetermined angle from the right position on a board.

FIGS. 3-5, and 6 are flow charts illustrating a method for acquiring the rotation information of components in a method for detecting a bridge connecting failure in FIG. 1. In addition, FIG. 7 is a plan view showing a state that components are arranged on the right position of board, and FIG. 8 is a plan view showing a state that the components of FIG. 7 are rotated at a predetermined angle from the right position. FIGS. 7 and 8 are herein drawings showing a state before soldering of the components 20.

In an exemplary embodiment of the present invention, the rotation information of components 20 may be acquired by using the height map of components 20. Particularly, referring to FIG. 3, the underlying data of components 20, for example, a reference template corresponding to the height map of components 20 is generated from CAD data in step S22*a*, and then the rotation information of components 10 may be acquired by comparison between the height map and the reference template in step 24*a*. For example, after the reference template is arranged in the right position of board 10 as shown in FIG. 7, the rotation information may be acquired by matching the reference template to the height map to the maximum as shown in FIG. 8 while rotating the reference template at a predetermined angle.

In another exemplary embodiment of the present invention, the rotation information of components 20 may be acquired by using the shadow map of components 20. Particularly, referring to FIG. 4, after the underlying data of components 20, for example, a shadow template abstracting the shadow of components 20 from CAD data is generated in step S22*b*, the rotation information of components 20 may be acquired by comparison between the shadow map and the shadow template in step 24*b*. For example, after the shadow template is arranged in the right position of board 10 as shown in FIG. 7, the rotation information may be acquired by matching the shadow template to the shadow map to the maximum as shown in FIG. 8 while rotating the shadow template at a predetermined angle.

In still another exemplary embodiment of the present invention, the rotation information of components 20 may be acquired by using the visibility map of components 20. Particularly, referring to FIG. 5, after the underlying data of components 20, for example, a form template corresponding to the visibility map of components 20 from CAD data is generated in step S22*c*, the rotation information of components 20 may be acquired by comparison between the visibility map and the form template in step 24*c*. For example, after the form template is arranged in the right position of board 10 as shown in FIG. 7, the rotation information may be acquired by matching the reference template to the visibility map to the maximum as shown in FIG. 8 while rotating the reference template at a predetermined angle, wherein the form template may be substantially the same as the reference template.

In yet another exemplary embodiment of the present invention, the rotation information of components 20 may be acquired by using at least one of the 2D images. Particularly, referring to FIG. 6, after the underlying data of components 20, for example, a reference image of components 20 from CAD data is generated in step S22*d*, the rotation information of components 20 may be acquired by comparison between the 2D image and the reference image. For example, after the reference image is arranged in the right position of board 10 as shown in FIG. 7, the rotation information may be acquired by matching the reference image to the 2D image to the maximum as shown in FIG. 8 while rotating the reference image at a predetermined angle, wherein the matching between the reference image and the 2D image is on the basis of the gray scale of gray level or colors.

The inspection region (or region of interest) ROI for bridge connecting failure detection of components 20 is established on the basis of the rotation information of components 20 in step S30. Particularly, in case the components 20 are composed of a body section 22 with a built-in driving circuit and a plurality of terminals 24 protruded from the body section 22, the inspection region ROI may be respectively established between the terminals 24 of components 20 on the basis of the rotation information. In an exemplary embodiment of the present invention, the inspection region ROI is arranged in a position corresponding to the terminals 24 as shown in the drawing and is respectively established between pads 12 of the board 10 which are electrically connected to the terminals 24, wherein it is preferable that the inspection region ROI is established not to overlap with the terminals 24 or the pads 12.

Figure 9:
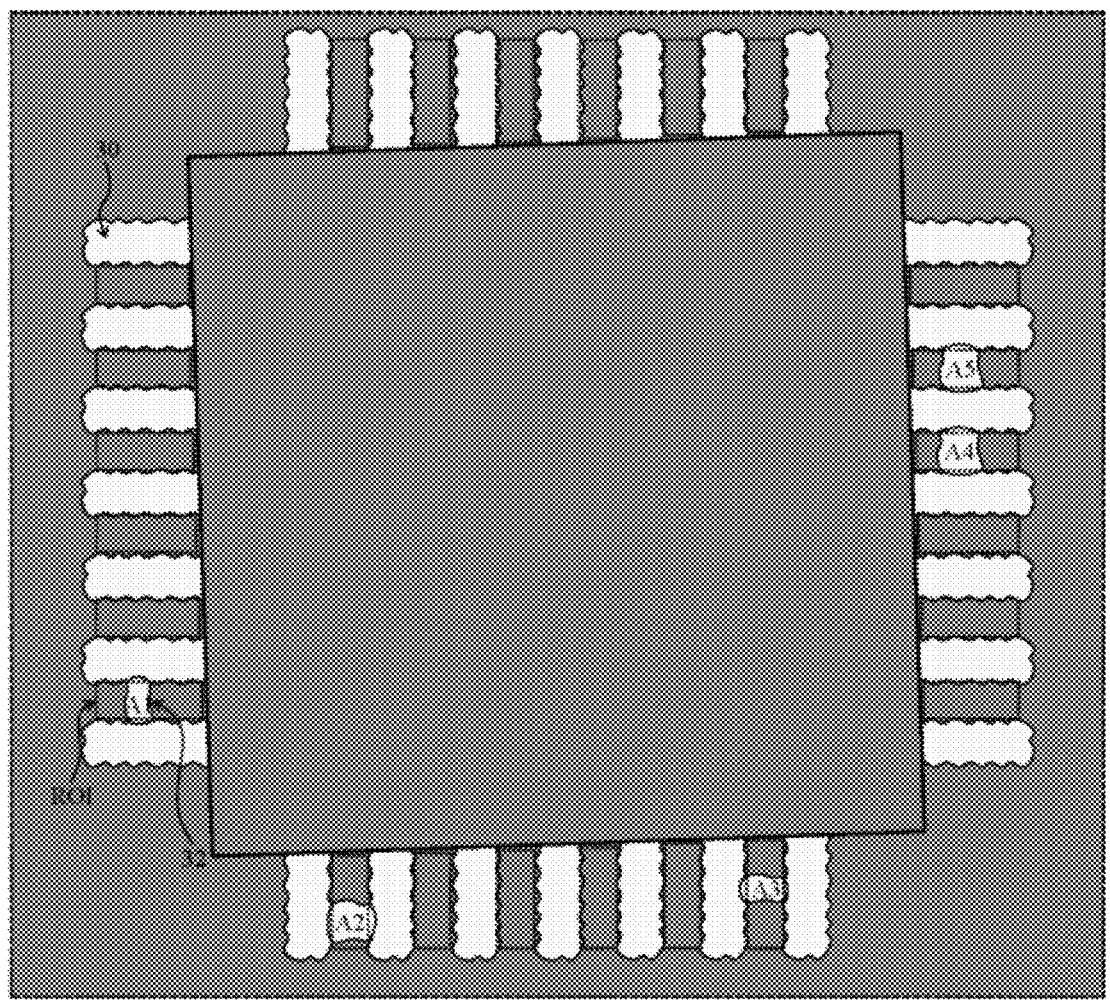
FIG. 9 is a drawing illustrating a method for extracting a first 2D bridge region from a first 2D image photographed by a first 2D lighting unit in FIG. 2.
Figure 10:
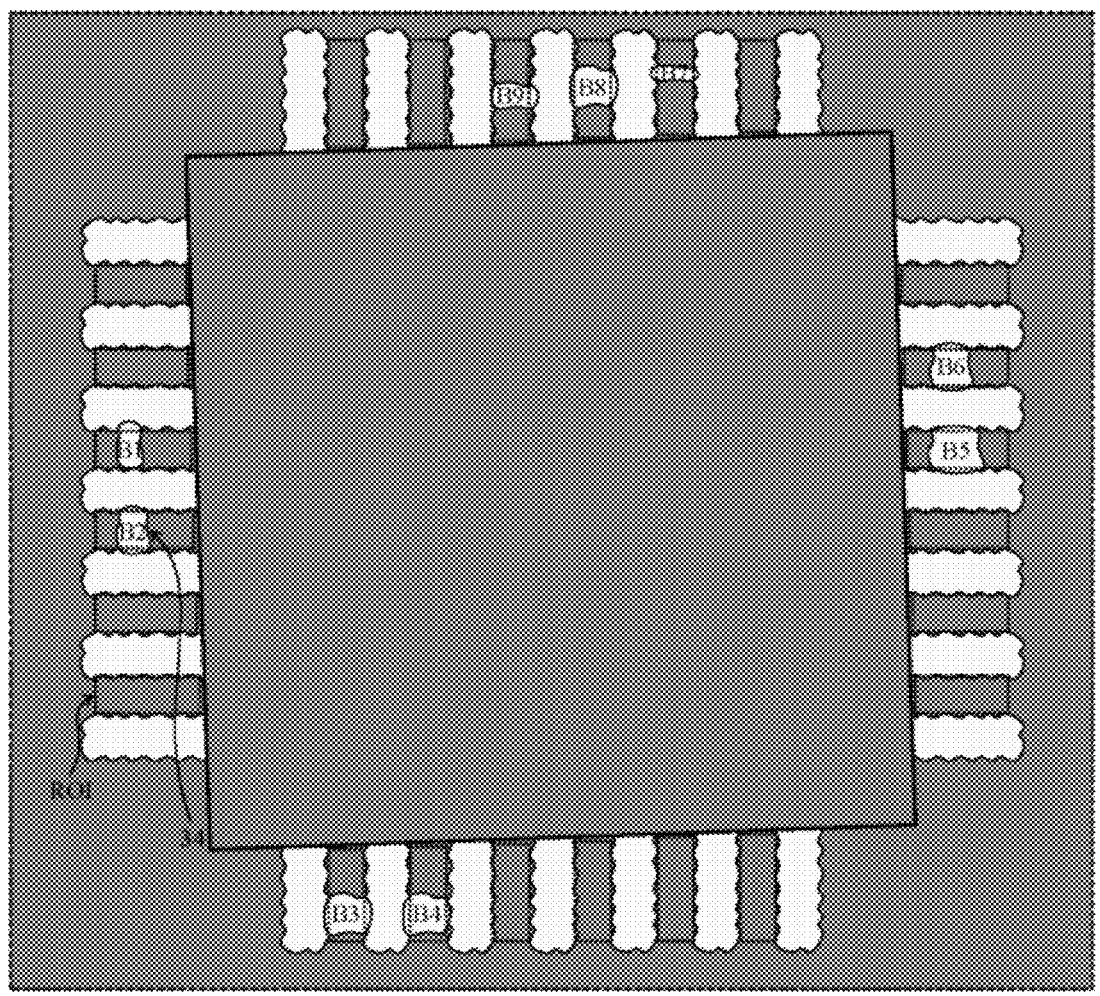
FIG. 10 is a drawing illustrating a method for extracting a second 2D bridge region from a second 2D image photographed by a second 2D lighting unit in FIG. 2.

FIG. 9 is the drawing illustrating a process for extracting the first 2D bridge region from the first 2D image photographed by the first 2D lighting unit of FIG. 2, and FIG. 10 is the drawing illustrating a process for extracting the second 2D bridge region from the second 2D image photographed by the second 2D lighting unit of FIG. 2, wherein FIGS. 9 and 10 are the drawings showing a state after soldering of the components 20 with a solder paste 30.

Referring to FIGS. 1, 9, and 10, after establishment of the inspection region ROI, the first bridge region within the inspection region ROI is extracted by using at least one of the 2D images in step S40. In the present embodiment, the first bridge region may be a union of 2D bridge regions in each of the 2D images.

Particularly, the first 2D bridge region 32 having the gray scale of the first 2D image more than a threshold may be extracted within the inspection region ROI, and the second 2D bridge region 34 having the gray scale of the second 2D image more than the threshold may be extracted within the inspection region ROI, wherein the threshold may be the minimum gray scale of a gray level which is judged as bridge. Otherwise, the first 2D bridge region 32 having the color of the first 2D image corresponding to the reference color range of solder may be extracted within the inspection region ROI, and the second 2D bridge region 34 having the color of the second 2D image corresponding to the reference color range may be extracted within the inspection region ROI. Then, the first bridge region may be formed by combining the first and second 2D bridge regions 32 and 34.

For example, the first 2D bridge region 32 as shown in FIG. 9 may be composed of bridges of A1, A2, A3, A4, and A5, and the second 2D bridge region 34 as shown in FIG. 10 may be composed of bridges of B1, B2, B3, B4, B5, B6, B7, B8, and B9. At this point, since bridges of A2, A4, and A5 are respectively the same as bridges of B3, B5, and B6, the first bridge region, the union of the first and second bridge regions, is composed of the total 11 bridges.

Figure 11:
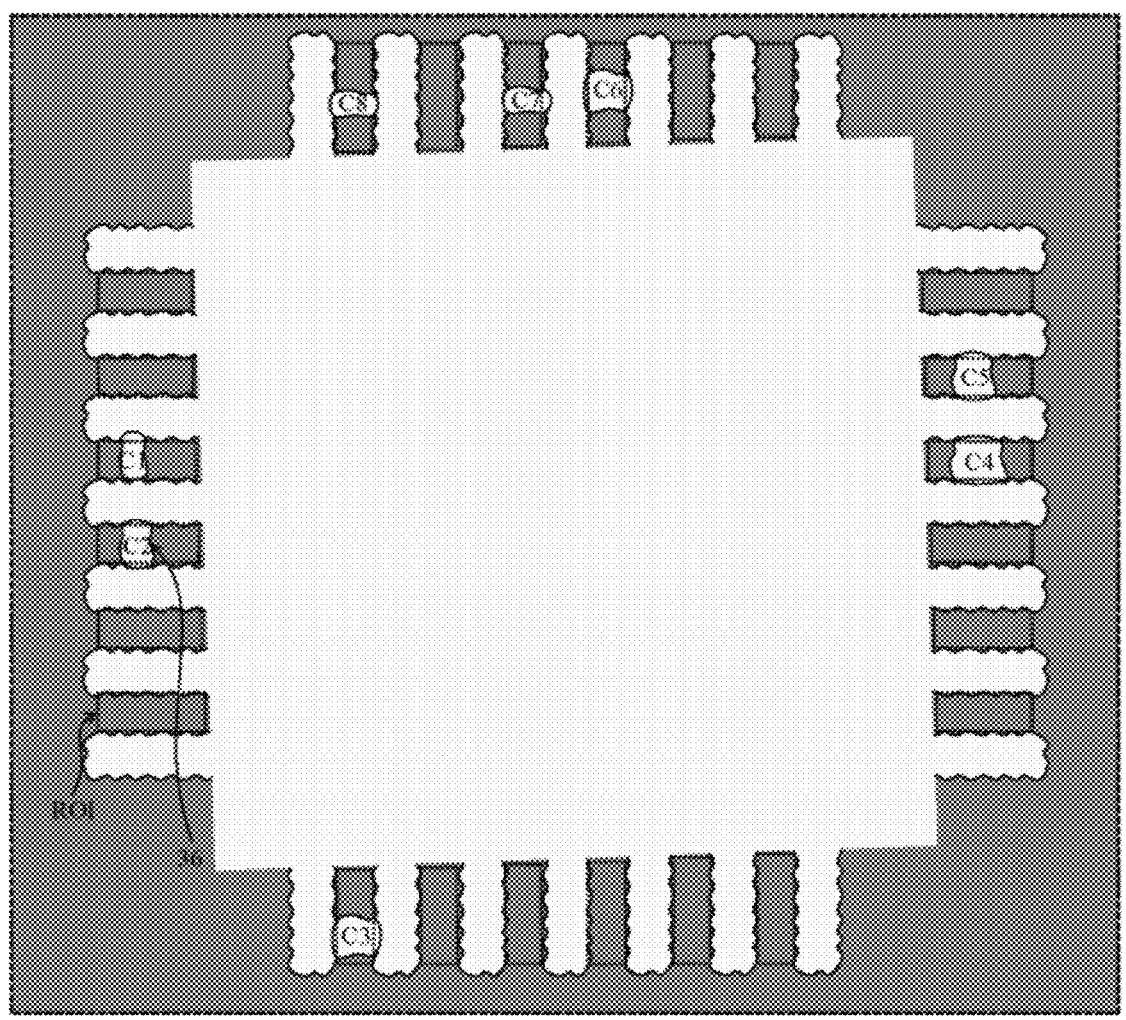
FIG. 11 is a drawing illustrating a method for extracting a second bridge region from height-based information acquired by a 3D lighting unit in FIG. 2.

FIG. 11 is the drawing illustrating a process for extracting the second bridge region from the height-based information acquired by the 3D lighting unit of FIG. 2, wherein the FIG. 11 is the drawings showing a state after soldering of the components 20 with solder paste 30.

Referring to FIGS. 1 and 11, after establishment of the inspection region ROI, the second bridge region 36 is extracted within the inspection region ROI by using height-based information in step S50. At this point, a process for extracting the second bridge region 36 may proceed simultaneously or proceed before or after with a process for extracting the first bridge region which is the union of the first and second 2D bridge regions.

In case the height-based information includes the height map of components, the second bridge region 36 may be a region having the height value of the height map more than a reference height value within the inspection region ROI. Otherwise, in case the height-based information includes the visibility map of components, the second bridge region 36 may be a region having the visibility value of the visibility map more than a reference visibility value within the inspection region ROI. In an exemplary embodiment of the present invention, the height-based information includes the height map and visibility map of components, the second bridge region 36 may be a region having the height value of the height map more than the reference height and having the visibility value of the visibility map more than the reference visibility value within the inspection region ROI. For example, the second bridge region 36 as shown in FIG. 7 may be composed of bridges of C1, C2, C3, C4, C5, C6, C7, and C8.

Then, the bridge connecting failure of components 20 is judged by using at least one of the first bridge region and the second bridge region 36 in step S60. Particularly, after extraction of a final bridge region corresponding to an intersection between the first bridge region and the second bridge region 36, the bridge connecting failure of components 20 is judged by using the final bridge region. Since the final bridge region corresponds to the intersection between the first bridge region and the second bridge region 36, it is highly possible that bridges herein the actually cause a bridge connecting failure.

Figure 6:
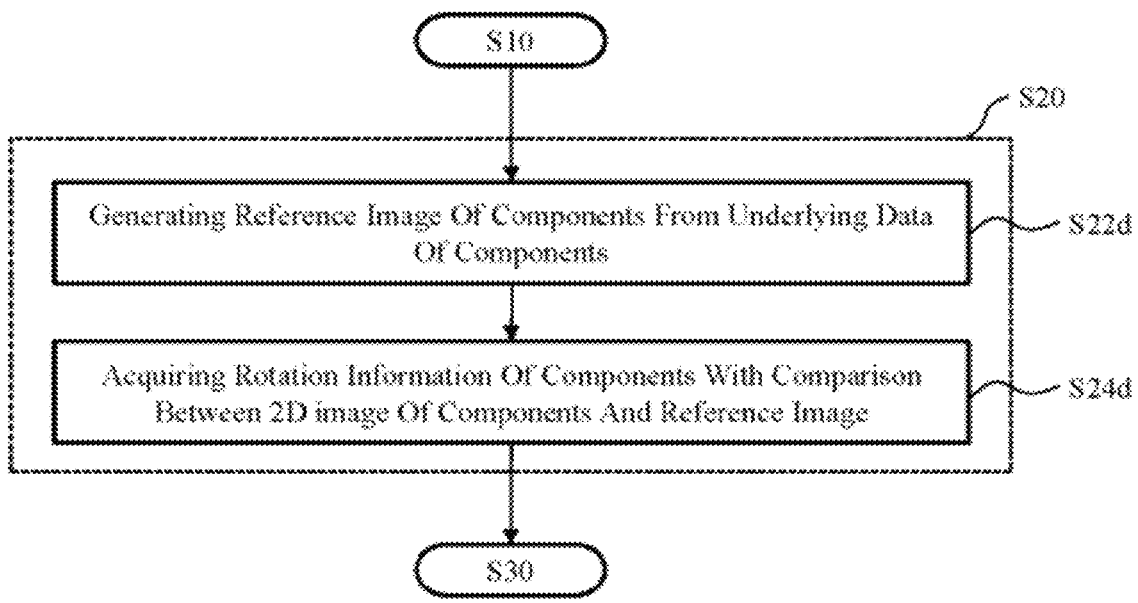

For example, the C1 bridge is identical to the B1 bridge of FIG. 6, and the C2 bridge is identical to the B2 bridge of FIG. 6. The C3 bridge is identical to the A2 bridge of FIG. 5 or the B3 of FIG. 6, and the C4 bridge is identical to the A4 bridge of FIG. 5 or the B5 of FIG. 6, and the C5 bridge is identical to the A5 bridge of FIG. 5 or the B6 of FIG. 6. The C6 bridge is identical to the B8 bridge of FIG. 6, and the C7 bridge is identical to the B9 bridge of FIG. 6. On the other hand, the C8 bridge is not shown in FIGS. 5 and 6. Therefore, the final bridge region is composed of the rest of bridges except for the C8 bridge of the 3D bridge region 36, that is, the total 7 bridges.

According to the present embodiment, the first bridge region is extracted from the 2D images photographed by lights which are illuminated at different angles, and the second bridge region 36 is extracted from the height-based information, and the final bridge region corresponding to the intersection between the first and second bridge regions is determined, thereby inspecting whether a bridge connecting failure occurs more precisely.

A detailed description of the present invention described above is disclosed with reference to the preferred embodiments of the present invention. In an exemplary embodiment of the present invention, it will be apparent to those skilled in the art that various modifications and variation can be made in the present invention without departing from the spirit or scope of the present invention set forth in claims which will be described later.

What is claimed is:

1. A method for detecting a bridge connecting failure that shorts terminals of a component, comprising:
   acquiring a 2D image and a height-based information through a plurality of lights which are irradiated on a board, on which the component is mounted, and are reflected from the board;
   acquiring rotation information of the component using at least one of the 2D image and the height-based information;
   establishing an inspection region for detection of the bridge connecting failure on the component on the basis of the rotation information;
   comparing the grey level of each pixel of the 2D image with a threshold level to detect a first group of bridge connecting failure position within the inspection region, wherein each of the first group of bridge connection failure position has a grey level exceeding a threshold level;
   detecting a second group of bridge connecting failure position within the inspection region using the height-based information; and
   judging a position where the first group of bridge connecting failure position overlaps the second group of bridge connecting failure position as a final bridge connecting failure position.

2. The method of claim 1, wherein the height-based information comprises at least one of a height map, a shadow map, and a visibility map.

3. The method of claim 2, wherein acquiring the rotation information of the component comprises:
   generating a reference template corresponding to the height map of the component from underlying data of the component; and
   acquiring the rotation information of the component with comparison between the height map and the reference template.

4. The method of claim 2, wherein acquiring the rotation information of the component comprises:
   generating a shadow template abstracting the shadow of the component from underlying data of the component; and
   acquiring the rotation information of the component with comparison between the shadow map and the shadow template.

5. The method of claim 2, wherein acquiring the rotation information of the component comprises:
   generating a form template corresponding to the visibility map of the component from underlying data of the component; and
   acquiring the rotation information of the component with comparison between the visibility map and the form template.

6. The method of claim 2, wherein acquiring the rotation information of the component comprises:
   generating a reference image of the component from underlying data of the component; and
   acquiring the rotation information of the component with comparison between the 2D image and the reference image.

7. The method of claim 1, wherein the first bridge region corresponds to a region having a color of the 2D image within a reference color range of solder within the inspection region.

8. The method of claim 1, wherein extracting the first bridge region comprises:
   extracting two or more 2D bride regions respectively using the two or more 2D images acquired by two or more lights which are irradiated on the board at different angles and are reflected from the board; and
   forming the first bridge region by combining the 2D bridge regions.

9. The method of claim 1, wherein the height-based information comprises a height map of the component, and the second bridge region is a region having a height value of the height map more than a reference height value within the inspection region.

10. The method of claim 1, wherein judging the bridge connecting failure of the component comprises:
   forming a final bridge region corresponding to the intersection of the first and second bridge regions; and
   judging the bridge connecting failure of the component using the final bridge region.

11. The method of claim 1, wherein the inspection region is established between the terminals of the component or pads of the board on the basis of the rotation information.

* * * * *